INVENTOR.
IRVING A. WARD
BY Lyon & Lyon
ATTORNEYS

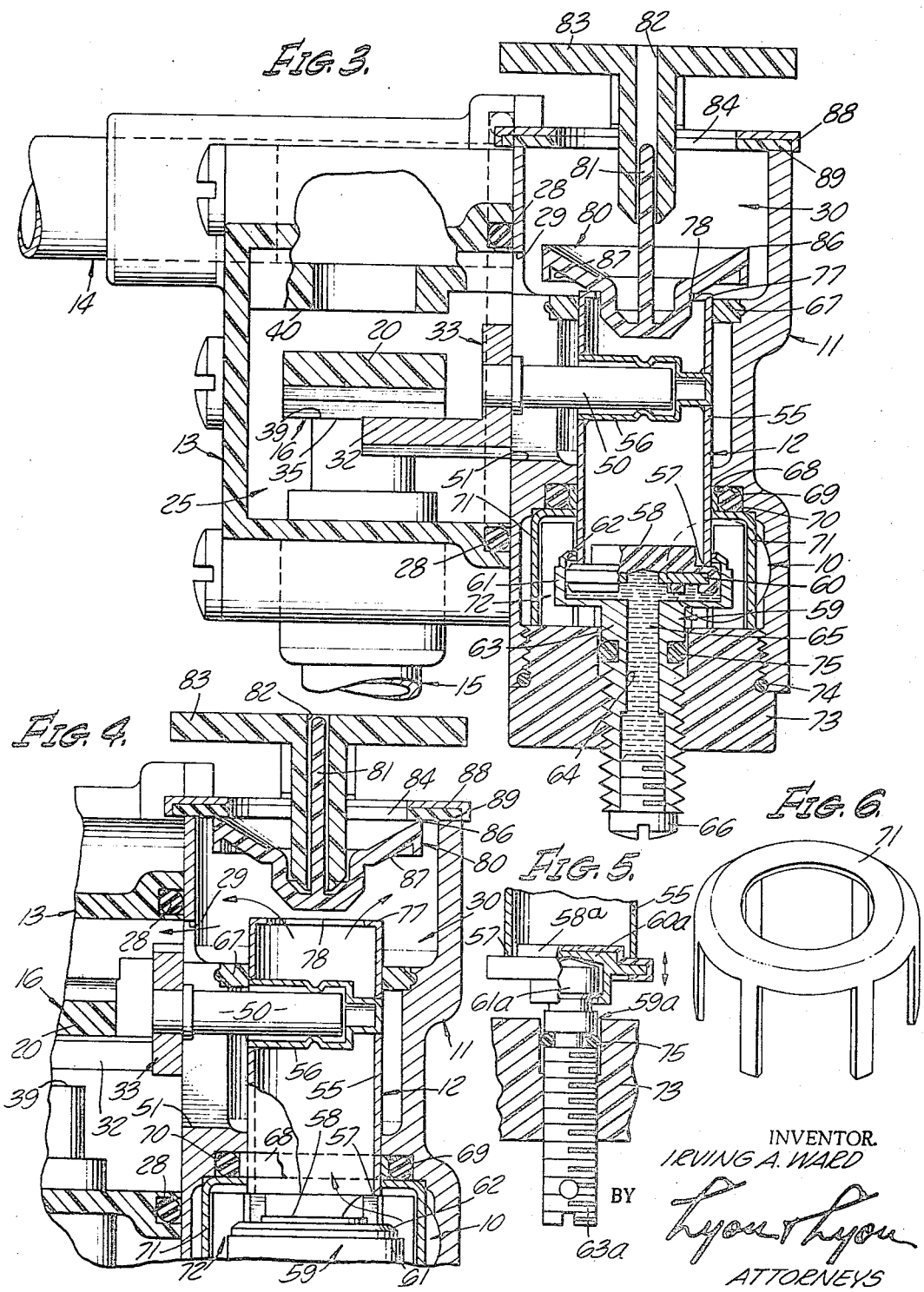

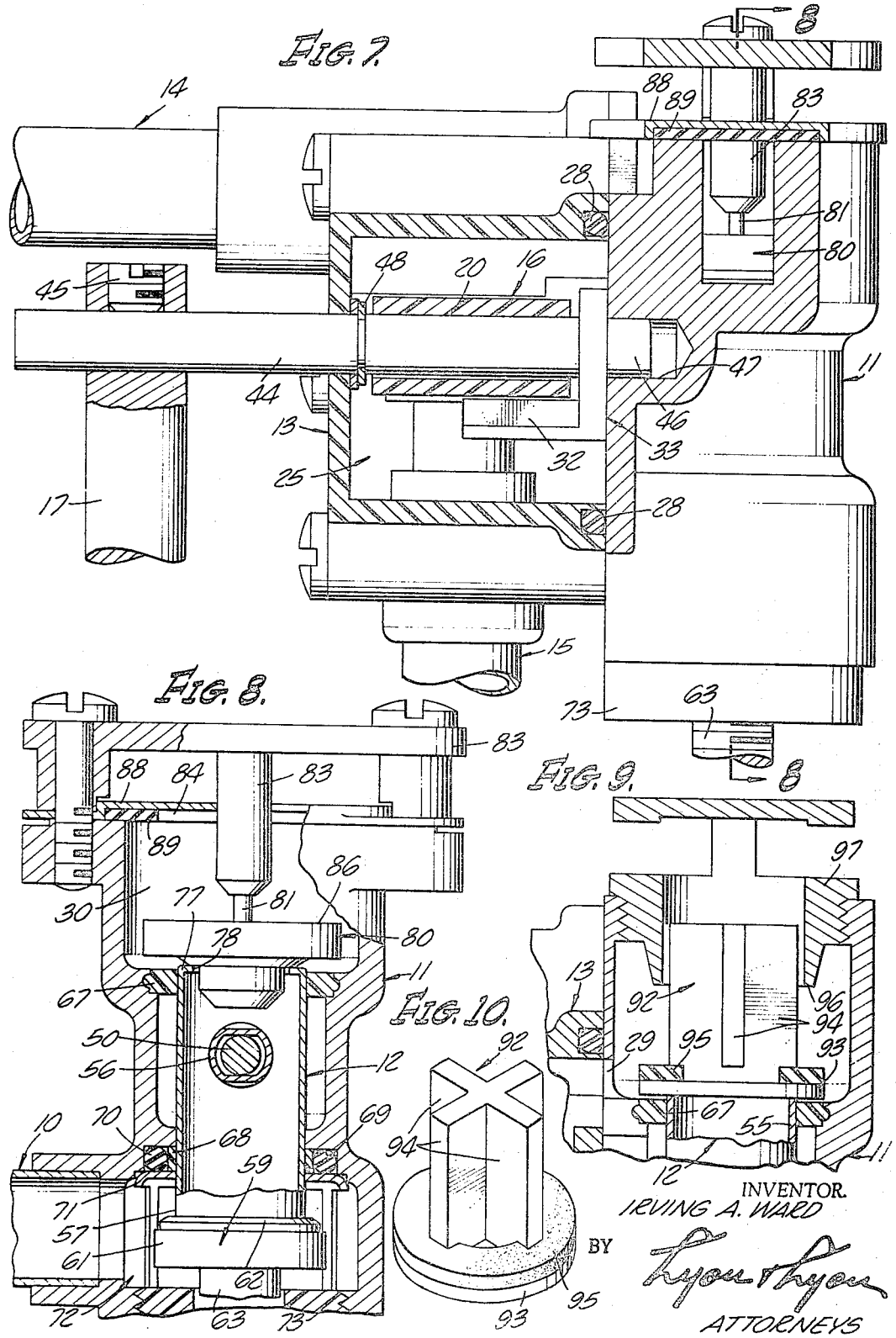

United States Patent Office 3,419,036
Patented Dec. 31, 1968

3,419,036
VALVE ASSEMBLY
Irving A. Ward, Hacienda Heights, Calif., assignor to Modern Faucet Manufacturing Company, Los Angeles, Calif., a corporation of California
Filed Jan. 18, 1967, Ser. No. 610,167
12 Claims. (Cl. 137—218)

ABSTRACT OF THE DISCLOSURE

A valve assembly for use in a water closet including a shutoff valve for turning on and off the water from a water supply in response to the position of the water closet float mechanism, and a transfer mechanism for diverting water from the shutoff valve to outlets for respectively supplying water to the bowl and the tank of the water closet.

---

This invention relates to an improved valve assembly and more particularly to an improved ball cock type valve assembly for a water closet.

Various valve assemblies and ball cock valves have been devised for controlling water flow into water closets. Typical water closets include a bowl and a reservoir, or tank, communicating with the bowl for holding a supply of water at a sufficient head for flushing the bowl through a drain. A valve assembly is provided to supply water for washing the bowl during flushing, refilling the bowl to a suitable level and refilling the tank. In my U.S. Patent application Ser. No. 516,006, filed Dec. 23, 1965, the disclosure of which is incorporated herein by reference, there is disclosed an improved valve assembly for use with water closets and particularly for use with one-piece water closets.

It is desirable that valve assemblies for water closets have a large capacity, open and close quickly, and the operation thereof not be adversely affected by water pressure changes. It is a principal object of the present invention to provide an improved valve assembly having these characteristics.

It is an additional object of the present invention to provide an improved valve which enables a large flow of water when open and which operates in a fast manner.

It is a further object of the present invention to provide an improved valve assembly including an improved transfer mechanism.

Another object of this invention is to provide an improved valve assembly having a self aligning seat assembly.

An additional object of this invention is to provide an improved valve assembly through which can pass a large volume of water and which operates efficiently and reliably.

These and other objects and features of the present invention will be better understood upon a consideration of the following description taken in conjunction with the drawings in which:

FIGURE 3 is a side sectional elevation of the valve taken along a line 3—3 of FIGURE 1 and illustrates the transfer mechanism and shutoff valve thereof, and a self aligning seat assembly;

FIGURE 4 is a partial sectional view, similar to FIGURE 3, but illustrates the shutoff valve in an open position;

FIGURE 5 is a partial sectional view of an alternative self aligning seat assembly;

FIGURE 6 is a perspective view of an individual component of the shutoff valve assembly;

FIGURE 7 is a side sectional elevation of the valve taken along a line 7—7 of FIGURE 1;

FIGURE 8 is a sectional elevation of the shutoff valve assembly taken along a line 8—8 of FIGURE 7; and FIGURES 9 and 10 illustrate an alternative antisiphon arrangement.

Figure 1:
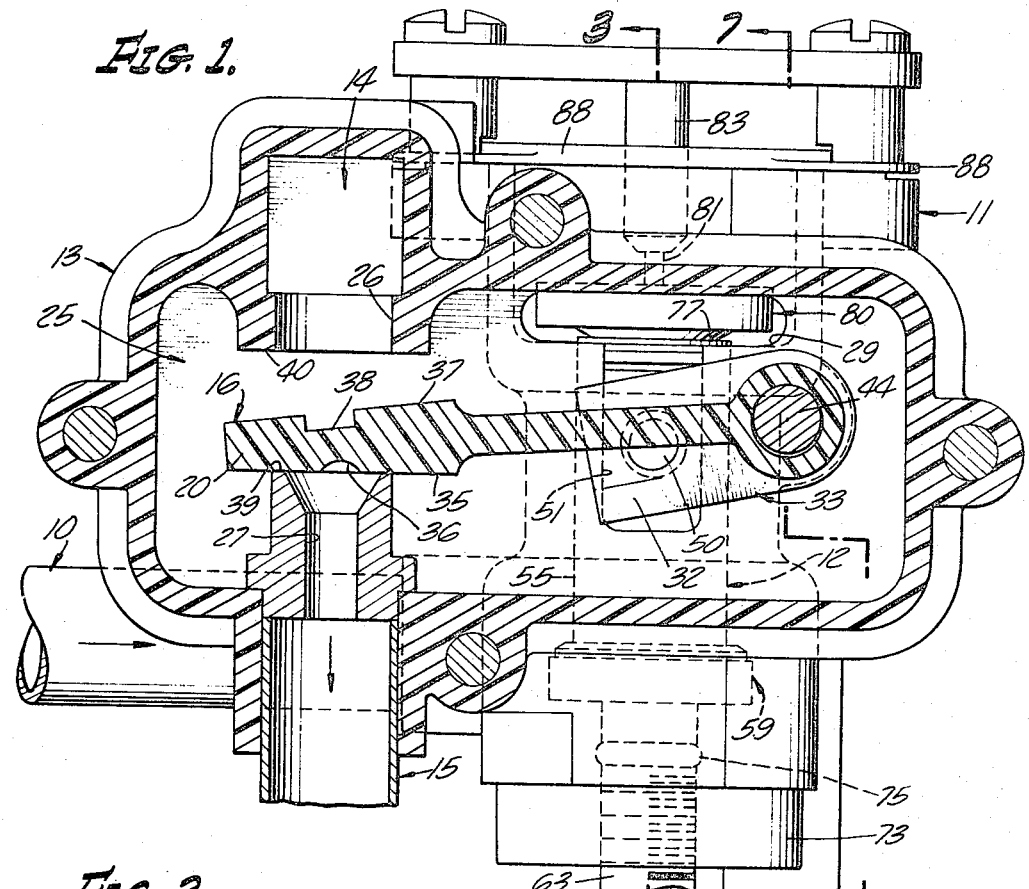
FIGURE 1 is a sectional elevation of an improved valve assembly according to the present invention and principally illustrates the transfer or diverter mechanism thereof in an "off" position.

Turning now to the drawings, a water inlet 10 is coupled to supply water into a shutoff valve body 11 through a shutoff valve assembly 12 into a transfer, or diverter, housing 13, and from the transfer housing through a first outlet 14 to the rim of a water closet and through a second outlet 15 to the tank of the water closet. As will appear subsequently, the shutoff valve assembly 12 and a transfer mechanism 16 in the transfer housing 13 are operated from a lever arm 17 (note FIGURE 7) coupled with a float (not shown) within the tank of the water closet. The entire valve assembly typically is mounted within the tank of the water closet above the water level therein.

Briefly, FIGURES 1 and 3 illustrate the improved valve assembly in an off position (the float of the water closet is up) with the shutoff valve assembly 12 closed and a flapper 20 of the transfer mechanism 16 in a down, or off, position. When the water closet is flushed, the float moves down with the decreasing water level in the tank of the water closet causing the shutoff valve assembly 12 to open (note FIGURE 4) thereby supplying water from the inlet 10 into the transfer housing 13 allowing the water to first flow through the outlet 14 to the rim of the water closet and to then flow past the flapper 20 (note FIGURE 2) through the outlet 15 into the tank. As the water level in the tank increases, the bowl of the water closet is refilled through the outlet 14 and ultimately the transfer mechanism and shutoff valve return to the off positions as shown in FIGURES 1 and 3.

The transfer mechanism housing 13 may be molded of plastic material, such as from the plastic material sold under the trade name Cycolac, and defines an internal chamber 25 communicating through ports 26 and 27 with the respective outlets 14 and 15. The housing 13 is secured to the valve body 11 with suitable bolts and sealed with respect thereto by a gasket 28. The chamber 25 within the housing 13 communicates through an opening 29 in the wall of the valve body 11 with a chamber 30 within the valve body 11. The flapper 20, which may be made from the same material as the housing 13, of the transfer mechanism 16 is mounted within the housing 13, and is operated by a finger 32 on a cam lever 33 to control the water flow from the chamber 25 within the housing 13 of the outlets 14 and 15. The flapper 20 has a lower face 35 having a slot 36 therein, and an upper face 37 having a groove 38 therein. The lower face 35 normally engages a seat 39 of the outlet port 27, and the upper face 37 engages a seat 40 of the outlet port 26 during refill of the tank of the water closet. Each of the faces typically forms an angle of approximately five degrees with respect to the center longitudinal axis of the flapper 20 as viewed in FIGURE 1. The slot 36 prevents lockup of the face 35 with the seat 39 after the tank is filled and allows the face 35 of the flapper to be easily moved away from the seat 39. The groove 38 in the face 37 allows water to flow through the outlet 14 to the bowl and trap of the water closet while the face 37 engages the seat 40 during refill of the tank.

The float lever arm 17 (note FIGURE 7) is affixed to a cam shaft 44 by a set screw 45. An end 46 of the cam shaft 44 is pivotally mounted within a bore 47 in the housing 11, and the cam lever 33 is affixed to the end 46 of the shaft 44. The shaft 44 extends through the housing 13 and is retained in position by a snap ring 48. The flapper 20 is loosely mounted (note FIGURE 1) on the shaft 44 and thus is operated by the finger 32 rather than by the shaft 44. As will appear subsequently, the normal displacement of the finger 32 from the underside of the flapper 20 times the operation of the flapper 20.

A pin 50 is affixed to the cam lever 33, and extends through a slot 51 in the wall of the body 11 to operate the shutoff valve assembly 12. The shutoff valve assembly 12 includes a valve plunger or piston 55 mounted within the body 11. The pin 50 extends into a sleeve bearing 56 which is soldered within the plunger 55. The plunger 55 has a skirt 57 which cooperates with a self-aligning seat 58 of an adjustable seat assembly 59 as best seen in FIGURE 3. The seat 58 is formed of rubber and secured onto a metal seat insert or washer 60. The seat 58 is mounted in a cup 61 having a flanged upper end 62 for retaining the seat within the cup. The cup forms the upper end of an adjustable seat screw 63. A bore or chamber 64 within the screw 63 communicates with the cup 61 and both are filled with a silicone grease 65 as shown in FIGURE 3. The bore is sealed at its lower end by a screw 66. This seat assembly allows a tripping action of the seat 58 to automatically align the seat with the lower end of the skirt 57 of the plunger 55.

The plunger 55 is mounted within the valve body 11 to move up or down under the control of the cam lever 33, and the periphery thereof is guided by an upper guide washer 67, which may be made of a plastic material such as that sold under the trade name Delrin, and a lower slipper ring 68 mounted in a groove 69 along with an O-ring 70. The slipper ring 68 preferably is made of a fluorocarbon resin such as that sold under the trade name Teflon. A support spider 71 is mounted within an inlet chamber 72 communicating with the inlet 10 at the lower end of the body 11, and is retained in position by a valve plug 73 which is sealed with respect to the valve body by an O-ring 74. The upper end of the support spider 71 retains the slipper ring 68 and the O-ring 70 in place as shown in FIGURE 3. A seal between the screw 63 and the plug 73 is provided by an O-ring 75. The screw 63 may be rotated to adjust the position of the seat 58.

An alternative adjustable seat assembly 69a having a self-aligning seat 58a as shown in FIGURE 5. The seat 58a is a rubber cover secured onto a metal insert 60a. The insert is secured onto the upper end 61a of an adjustable seat screw 63a. The insert 60a is slightly loose on the end 61a to allow a slight tipping action for alignment of the seat 58a with the skirt 57 of the plunger 55.

The plunger 55 is in the form of a tube thereby providing a large passageway between the lower and upper ends thereof. The upper end 77 of the plunger is open at 78 to allow water to flow into the upper chamber 30 in the body 11 and out through the opening 29 when the shutoff valve is open. The opening 78 normally is closed by an antisiphon air supply check plug 80. The plug 80 includes a central finger 81 coaxially mounted within an aperture 82 in an open cover member 83 affixed to the body 11 as best seen in FIGURES 3 and 4. An antisiphon air inlet 84 is provided at the upper end of the body 11. The upper edge 86 of the plug 80 seals the inlet 84 when the shutoff valve assembly 12 is open since water acting on the underside 87 of the plug 80 forces the plug up to the position shown in FIGURE 4. A cap 88 and washer 89 are provided on the upper end of the body 11. An alternative check plug 92 is illustrated in FIGURES 9 and 10 and includes a base 93 and upstanding guides 94. A washer 95 is secured on the plug 92 and seats with the lower face 96 of an antisiphon air inlet plug 97 when the shutoff valve assembly is open.

Figure 2:
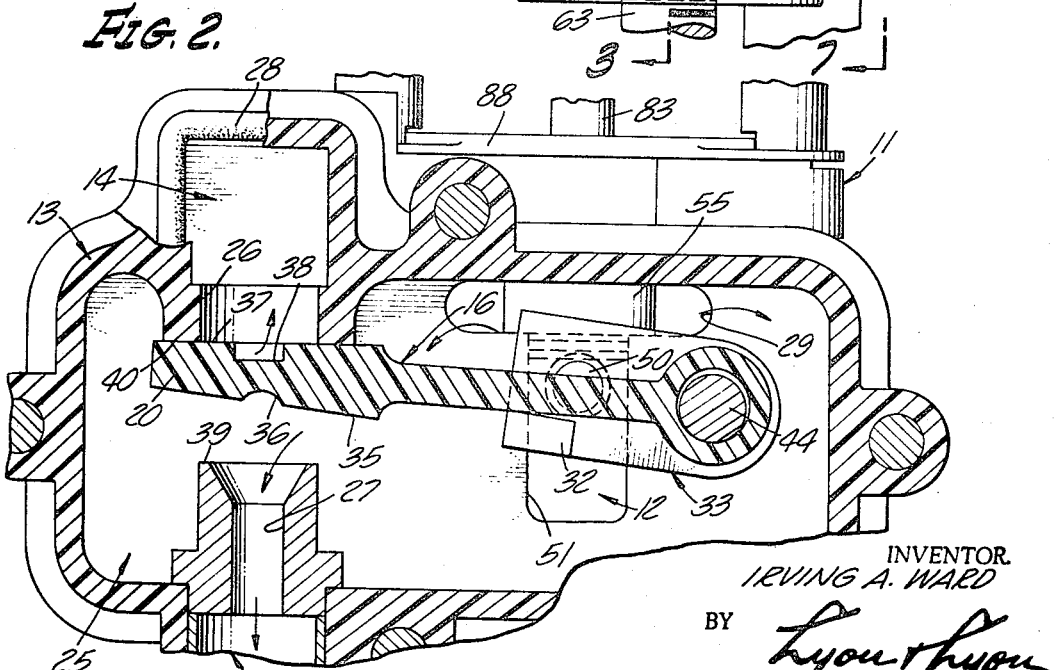
FIGURE 2 is a view similar to FIGURE 1 but illustrates the transfer mechanism in an "operating" position.

When the water closet is flushed, the lowering float (not shown) causes the cam shaft 44 to rotate clockwise as viewed in FIGURES 1 and 2. The initial rotation of the cam shaft 44 causes the cam lever 33 to raise the valve plunger 55 and initially open the shutoff valve before the flapper 20 moves from the position shown in FIGURE 1. Water thus commences to flow from the inlet 10 past the seat 58, through the plunger 55, raises the plug 80 and flows into the chamber 30, through the opening 29 and into the chamber 25 in the housing 13, and out through the port 26 and outlet 14. Upon further lowering of the float, the cam shaft 44 continues to rotate clockwise as seen in FIGURES 1 and 2 ultimately causing the finger 32 of the cam lever 33 to engage the underside of the flapper 20 thereby pivoting the flapper clockwise. When the finger 32 unseats the flapper 20 from the seat 39, the flapper essentially floats up into engagement with the seat 40 and remains there until the end of the refill cycle and then drops back down. Also, this further rotation of the shaft 44 causes the skirt 57 of the plunger 55 to move further away from the seat 58 allowing a greater water flow into the chamber 25 in the housing 13. When the face 35 of the flapper 20 moves away from the seat 39, water flows through the port 27 and outlet 15 to fill the tank of the water closet. Also, during this time, a small amount of water flows past the groove 38 in the upper face 37 of the flapper 20 and into the port 26 and outlet 14 to the bowl of the water closet to fill the water trap thereof during refill of the tank through the outlet 15. As the tank fills, the float ball rises thereby rotating the cam shaft 44 counter clockwise as seen in FIGURES 1 and 2. Ultimately, the skirt 57 of the valve plunger 55 again engages the seat 58 thereby terminating water flow through the shutoff valve assembly 12 and allowing the air supply check plug to return to the position shown in FIGURE 3, and the flapper drops back down as water diminishes in the chamber 25.

It will be apparent that the shutoff valve assembly enables a relatively large opening between the skirt 57 and the seat 58 because a large plunger stroke is provided, and this enables a large volume of water to be passed through the valve whereas typical prior art valves for water closets provide only a slight movement and thus a low volume of water flow. Additionally, the plunger may have a relatively large diameter for accommodating the large volume of flow, and the plunger is relatively lightweight allowing it to be readily moved. The configuration of the shutoff valve assembly enables quick and reliable operation even with changes in inlet water pressure. The assembly also is essentially self-cleaning. The seat 58 is adjustable up and down, and is self aligning with respect to the skirt 57. The adjustable seat assembly 59 obviates the necessity of bending the float lever arm 17 to obtain the desired action of the valve assembly.

The present embodiments of this invention are to be considered in all respects as illustrative and not restrictive, the scope of the invention being indicated by the appended claims rather than by the foregoing description, and all changes which come within the meaning and range of equivalency of the claims therefore are intended to be embraced therein.

What is claimed is:

1. A valve assembly for supplying water from an inlet through plural outlets to a water closet, comprising
    a shutoff valve having a plunger with a passageway therethrough and a valve seat within a valve body, said plunger being movable with respect to said seat to open said shutoff valve and pass water from said inlet through an opening in said body,
    a transfer mechanism including a housing having a chamber therein communicating with said plural outlets and said opening in said valve body for allowing water to flow into said chamber when said shutoff valve is open, said transfer mechanism including transfer flapper means mounted within said housing, said flapper means being movable to selectively restrict any one of said plural outlets to restrict water flow from said chamber to a respective outlet, and
    cam means adapted to be operated by a float mechanism of a water closet, said cam means being coupled with said plunger for moving said plunger with respect to said valve seat to open and close said shutoff valve, and said cam means including a finger for engaging said flapper means and causing said flapper means to selectively restrict respective plural outlets.

2. A shutoff valve assembly and transfer mechanism as in claim 1 wherein
said finger of said cam means normally is displaced from said flapper means to provide a predetermined delay between movement of said plunger to open said shutoff valve and engagement of said flapper means.

3. A shutoff valve and transfer mechanism as in claim 2 wherein
said flapper means includes an elongated member having a pair of faces for respectively restricting said plural outlets, one of said faces having a groove therein for allowing an amount of water to pass to one of said outlets when said one outlet is restricted by said one face.

4. A shutoff valve and transfer mechanism as in claim 2 wherein
said cam means is coupled with said plunger to cause said plunger to reciprocate with respect to said valve seat, and
the position of said valve seat within said valve body is adjustable to select the required movement of said cam means to move said plunger for opening and closing said shutoff valve.

5. A shutoff valve and transfer mechanism as in claim 1 wherein
said plunger includes a skirt and a first end thereof for engaging said valve seat and an opening in a second end thereof for allowing communication with said opening in said valve body, and
plug means mounted in said valve body for closing said opening in said second end of said plunger when said shutoff valve is closed and for moving away from said opening in said plunger when said shutoff valve is open to restrict an antisiphon air inlet of said shutoff valve body.

6. A shutoff valve and transfer mechanism as in claim 1 wherein
said plunger includes a skirt, and
said valve seat includes a resilient seat member coupled with an end of an adjustable member, said seat member being relatively movable with respect to said end of said adjustable member for allowing self-alignment between said seat member and said skirt of said plunger.

7. A shutoff valve assembly for use with a water closet comprising
a valve body having a water inlet, a water outlet and an antisiphon air inlet,
a movable plunger mounted within said body, said plunger having a skirt at one end and an opening at the other end with a passageway communicating between said ends,
a valve seat mounted within said body and engageable by the skirt of said plunger, and
cam means adapted to be operated by a float mechanism of a water closet, said cam means being coupled with said plunger for moving the skirt thereof into engagement with said valve seat to close said valve, and for moving said skirt away from said seat for opening said valve and allowing water to flow from said water inlet through said passageway to said water outlet.

8. A shutoff valve assembly as in claim 7 wherein
said valve seat includes a resilient seat member coupled with an adjustable member, said seat member being movable relative to said adjustable member for allowing self alignment between said seat member and said skirt of said plunger.

9. A shutoff valve assembly as in claim 8 wherein
an end of said adjustable member is in the form of a cup and said seat member is retained within said cup, said adjustable member includes a chamber therein, and said chamber includes a fluid therein and a portion of said seat member bears against said fluid for allowing said seat member to tip with respect to said adjustable member for enabling self-alignment between said seat member and said skirt.

10. A shutoff valve assembly as in claim 7 including
plug means mounted in said valve body for normally closing said opening in said other end of said plunger when said shutoff valve is closed, and said plug means is movable to restrict said antisiphon air inlet when water flows through said opening in said other end of said plunger.

11. A transfer mechanism for use with a shutoff valve assembly for supplying water through plural outlets to a water closet, comprising
a housing having an inlet communicating through a chamber therein with said outlets,
valve seats adjacent said outlets,
transfer flapper means including an elongated member having a pair of faces for respectively engaging said seats and restricting water flow from said chamber to respective plural outlets, one of said faces having a groove therein for allowing an amount of water to pass to a respective outlet when restricted by said one face of said flapper means, and
cam means adapted to be operated by a float mechanism of a water closet, said cam means including a finger for engaging and pivoting said elongated member after a predetermined movement of said cam means to cause said member to move away from one seat of said one face to engage a second seat.

12. A transfer mechanism as in claim 10 wherein
said cam means includes a shaft defining a pivot thereof, said elongated member is formed of plastic material and is loosely mounted on said shaft, a second face of said member being discontinuous to prevent a complete seal with said one seat.

References Cited

UNITED STATES PATENTS

| | | | |
|---|---|---|---|
| 1,632,625 | 6/1927 | Sasser | 137—628 |
| 2,161,813 | 6/1939 | Groeninger | 137—218 |
| 2,226,350 | 12/1940 | Sloan et al. | 137—218 |
| 2,257,199 | 9/1941 | Sloan | 137—218 |
| 2,288,231 | 6/1942 | Drane | 137—410 XR |
| 2,673,618 | 3/1954 | Batchelder | 137—411 XR |
| 2,777,460 | 1/1957 | Svirsky | 137—218 |
| 3,171,424 | 3/1965 | Shames et al. | 137—410 XR |

STANLEY N. GILREATH, *Primary Examiner.*

WERNER H. SCHROEDER, *Assistant Examiner.*

U.S. Cl. X.R.

137—410, 625.44